United States Patent
Yu et al.

(10) Patent No.: US 11,434,884 B2
(45) Date of Patent: Sep. 6, 2022

(54) LINEAR COMPRESSOR

(71) Applicant: LG ELECTRONICS INC., Seoul (KR)

(72) Inventors: Hyosang Yu, Seoul (KR); Sanga Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/245,468

(22) Filed: Apr. 30, 2021

(65) Prior Publication Data
US 2021/0246890 A1 Aug. 12, 2021

Related U.S. Application Data

(62) Division of application No. 16/514,496, filed on Jul. 17, 2019, now Pat. No. 11,204,020.

(30) Foreign Application Priority Data

Jul. 17, 2018 (KR) .......................... 10-2018-0082696

(51) Int. Cl.
*F04B 17/03* (2006.01)
*F04B 7/02* (2006.01)
(Continued)

(52) U.S. Cl.
CPC ............ *F04B 17/03* (2013.01); *F04B 7/0266* (2013.01); *F04B 9/06* (2013.01); *F04B 19/04* (2013.01); *F04B 39/0055* (2013.01); *F04B 39/0088* (2013.01); *F04B 39/0207* (2013.01); *F04B 39/123* (2013.01); *F16K 15/025* (2013.01);
(Continued)

(58) Field of Classification Search
CPC ........ F04B 17/03; F04B 9/06; F04B 2203/04; F25B 1/02
See application file for complete search history.

(56) References Cited

U.S. PATENT DOCUMENTS 3,143,281 A 8/1964 Heinrich
3,751,025 A * 8/1973 Beery ....................... F16F 1/08
267/180

(Continued)

FOREIGN PATENT DOCUMENTS

EP 2960503 12/2015
JP 2003512581 4/2003
(Continued)

OTHER PUBLICATIONS

Office Action in European Appln. No. 19186510.4, dated Dec. 23, 2021, 10 pages.
(Continued)

*Primary Examiner* — Patrick Hamo
(74) *Attorney, Agent, or Firm* — Fish & Richardson P.C.

(57) ABSTRACT

A linear compressor includes a spring axially elastically supporting a driving assembly. The spring includes a spring body axially extending, a front spring link forming an end of the spring body by extending from a side of the spring body, and a rear spring link forming the other end of the spring body by extending from the other side of the spring body. Any one of the front spring link and the rear spring link is fixed to the driving assembly and the other one is fixed to a supporting assembly.

20 Claims, 13 Drawing Sheets

(51) Int. Cl.
  *F04B 9/06* (2006.01)
  *F04B 19/04* (2006.01)
  *F04B 39/00* (2006.01)
  *F04B 39/02* (2006.01)
  *F04B 39/12* (2006.01)
  *F16K 15/02* (2006.01)
  *F25B 1/02* (2006.01)

(52) U.S. Cl.
  CPC ............ *F25B 1/02* (2013.01); *F04B 2203/04* (2013.01); *F04B 2205/01* (2013.01); *F04B 2205/04* (2013.01)

(56) References Cited

U.S. PATENT DOCUMENTS

| | | | | |
|---|---|---|---|---|
| 4,889,327 A * | 12/1989 | Seyler | ........................ | B21F 3/04 267/180 |
| 5,310,167 A * | 5/1994 | Noll, Jr. | ................... | F16F 1/024 267/286 |
| 5,482,261 A * | 1/1996 | Ortega | ....................... | F16F 3/06 267/168 |
| 5,772,191 A * | 6/1998 | Nakano | .................... | F16F 1/125 267/179 |
| 5,944,302 A * | 8/1999 | Loc | ............................ | F16F 3/04 267/180 |
| 6,612,556 B2 * | 9/2003 | Petrina | ................... | F16F 1/3665 267/168 |
| 7,153,108 B2 | 12/2006 | Puff et al. | | |
| 7,247,007 B2 * | 7/2007 | Roke | ........................ | F16F 1/123 267/180 |
| 9,562,525 B2 * | 2/2017 | Hahn | .................... | F04B 35/045 |
| 9,841,012 B2 * | 12/2017 | Beers | ................... | F04B 39/0005 |
| 2003/0127787 A1 * | 7/2003 | Konig | ...................... | E04C 5/167 267/179 |
| 2013/0099435 A1 * | 4/2013 | Matsuoto | ................. | F16F 1/123 267/166 |
| 2015/0369225 A1 * | 12/2015 | Ha | ......................... | F04B 35/045 417/443 |
| 2016/0116013 A1 * | 4/2016 | Tardy-Tuch | .......... | B29C 48/151 156/213 |

FOREIGN PATENT DOCUMENTS

| | | |
|---|---|---|
| KR | 1020060039178 | 5/2006 |
| KR | 1020100092501 | 8/2010 |
| KR | 1020180053859 | 5/2018 |
| WO | WO2011082461 | 7/2011 |
| WO | WO2018030779 | 2/2018 |

OTHER PUBLICATIONS

EP Search Report in European Application No. EP 19186510, dated Oct. 16, 2019, 12 pages.
United States Office Action in U.S. Appl. No. 16/514,496, dated Mar. 16, 2021, 17 pages.
Korean Notice of Allowance in Korean Application No. 10-2018-0082696, dated Jun. 24, 2020, 5 pages (with English translation).

* cited by examiner

LINEAR COMPRESSOR

CROSS REFERENCE TO RELATED APPLICATION

The present application is a division of U.S. application Ser. No. 16/514,496, filed on Jul. 17, 2019, which claims priority to Korean Patent Application No. 10-2018-0082696, filed on Jul. 17, 2018, the entire contents of which is incorporated herein for all purposes by this reference.

FIELD

The present disclosure relates to a linear compressor.

BACKGROUND

In general, a compressor, which is a mechanical apparatus that increases the pressure of air, a refrigerant, or other various working gases by compressing them using power from a power generator such as an electric motor or a turbine, is generally used for appliances or throughout industry.

Compressors can be classified in a broad sense into a reciprocating compressor, a rotary compressor, and a scroll compressor.

As for the reciprocating compressor, a compression space into or from which a working gas is suctioned or discharged is formed between a piston and a cylinder and the piston compresses the refrigerant by reciprocating straight in the cylinder.

As for the rotary compressor, a compression space into or from which a working gas is suctioned or discharged is formed between a roller that eccentrically rotates and a cylinder and the roller compresses the working gas by eccentrically rotating on the inner side of the cylinder.

As for the scroll compressor, a compression space into or from which a working gas is suctioned or discharged is formed between an orbiting scroll and a fixed scroll and the orbiting scroll compresses a refrigerant by rotating on the fixed scroll.

Recently, a linear compressor that can improve compression efficiency with a simple structure without a mechanical loss due to conversion of motions by having a piston directly connected to a driving motor that generates a straight reciprocating motion has been developed as one of the reciprocating compressors.

The linear compressor suctions, compresses, and then discharges a refrigerant by reciprocating straight the piston in a cylinder using a linear motor in a sealed shell.

Further, the linear compressor may include a resonant spring for stably moving an actuator including the piston. The resonant spring is understood as a component that reduces vibration and noise due to movement of the actuator.

The applicant(s) has filed the following Prior Art Document 1 in connection with a linear compressor with a resonant spring structure.

<Prior Art Document 1>
1. Publication No.: 10-2018-0053859 (Publication Date: May 24, 2018)
2. Title of Invention: Linear compressor A plurality of resonant springs is disposed behind a piston in the linear compressor of Prior Art Document 1. The resonant springs include a first resonant spring disposed between a supporter that supports the piston and a stator cover that supports an outer stator and a second resonant spring disposed between the supporter and a rear cover.

The linear compressor of Prior Art Document has the following problems.

In Prior Art Document, an actuator that reciprocates is supported by the supporter between the first resonant spring and the second resonant spring. Any one of the first resonant spring and the second resonant spring is compressed when the actuator reciprocates, thereby supporting the actuator. That is, the actuator is supported only by compressive force of the first resonant spring and the second resonant spring.

In short, (1) only the compressive sections of the springs can be used in the structure of Prior Art Document 1. Accordingly, there is a problem that a plurality of springs has to be used to support the reciprocating actuator.

(2) Further, since only the compressive sections of the springs are used, the force that is applied to one spring is relatively small. Accordingly, there is a problem that large stress is generated in the springs.

(3) Further, since a plurality of springs is installed, relatively many spaces are required to install the springs. Accordingly, there is a problem that a shell in which the springs are installed is increased in size, the size of the compressor is increased, and the installation space is limited.

SUMMARY

The present invention has been made in an effort to solve the problems and an object of the present invention is to provide a linear compressor that uses both of tensile force and compressive force of a spring by fixing both ends of the spring.

In particular, an object of the preset invention is to provide a linear compressor that supports a driving assembly that reciprocates, using one spring by using both of tensile force and compressive force of the spring.

Another object of the present invention is to provide a linear compressor including small and compact shell because one spring is disposed in the shell.

A linear compressor according to an aspect of the present invention includes: a shell that forms an external shape; a driving assembly that axially reciprocates in the shell; a supporting assembly that supports the driving assembly in the shell; and a spring coupled to the driving assembly and the supporting assembly to axially elastically support the driving assembly.

The spring includes a spring body axially extending, a front spring link forming an end of the spring body by extending from a side of the spring body, and a rear spring link forming the other end of the spring body by extending from the other side of the spring body.

Any one of the front spring link and the rear spring link is fixed to the driving assembly and the other one is fixed to a supporting assembly.

Accordingly, the spring is fixed at both ends and can elastically support the driving assembly using both of tensile force and compressive force.

According to the linear compressor of an embodiment of the present invention having the configuration described above, there are the following effects.

It is possible to support a driving assembly that reciprocates with one spring using both of tensile force and compressive force of the spring with both ends of the spring fixed.

In particular, since both of tensile force and compressive force of the spring are used, the spring can support larger load or repetitive load.

Further, since the driving assembly is supported by one spring, the inside of the shell in which the spring is installed can be simplified. Further, it is possible to reduce the size of the shell, whereby the size of the linear compressor is decreased. Further, a space where the compressor is installed can be reduced, so the compressor can be more freely installed.

Further, the spring can be formed in various shapes. Accordingly, it is possible to effectively support the driving assembly by forming the spring in various shapes, if necessary.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
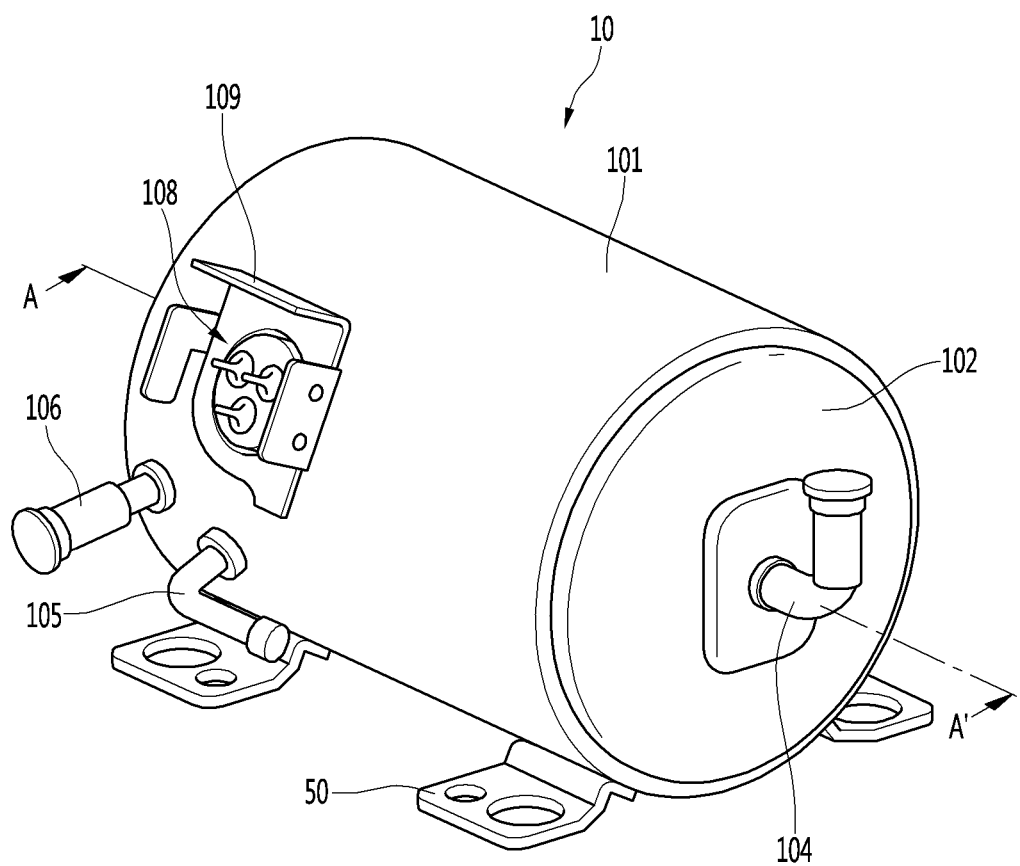
FIG. 1 is a view showing a linear compressor according to an embodiment of the present invention.

Hereinafter, embodiments of the present invention are described in detail with reference to exemplary drawings. When components are given reference numerals in the drawings, the same components are given the same reference numerals even if they are shown in different drawings. Further, in the following description of embodiments of the present invention, when detailed description of well-known configurations or functions is determined as interfering with understanding of the embodiments of the present invention, they are not described in detail.

Further, terms 'first', 'second', 'A', '(a)', and '(b)' can be used in the following description of the components of embodiments of the present invention. The terms are provided only for discriminating components from other components and, the essence, sequence, or order of the components are not limited by the terms. When a component is described as being "connected", "combined", or "coupled" with another component, it should be understood that the component may be connected or coupled to another component directly or with another component interposing therebetween.

FIG. 1 is a view showing a linear compressor according to an embodiment of the present invention.

As shown in FIG. 1, a linear compressor 10 according to an embodiment of the present invention includes a shell 101 and shell covers 102 and 103 (see FIG. 3) combined with the shell 101. In a broad sense, the shell covers 102 and 103 may be understood as components of the shell 101.

Legs 50 may be coupled to the bottom of the shell 101. The legs 50 may be coupled to the base of a product on which the linear compressor 10 is installed. For example, the product may include a refrigerator and the base may include the mechanical chamber base of the refrigerator. Alternatively, the product may include the outdoor unit of an air-conditioning system and the base may include the base of the outdoor unit.

The shell 101 may have a substantially cylindrical shape and may be laid down laterally or axially. On the basis of FIG. 1, the shell 101 may be laterally elongated and may have a relatively small radial height. That is, the linear compressor 10 may be small in height, so when the linear compressor 10 is disposed on the base of the mechanical chamber of a refrigerator, the height of the mechanical chamber can be reduced.

Further, the shell 101 of the linear compressor 10 according to an aspect of the present invention may have a relatively small lateral length. In this case, the length means an axial length. This is because a supporting structure of a driving assembly to be described below is simplified. Accordingly, the shell 101 has a relatively small volume, so a space for installing the linear compressor 10 can be considerably reduced.

A terminal 108 may be disposed on the outer side of the shell 101. The terminal 108 is understood as a component that transmits external power to a motor assembly 140 (see FIG. 3) of the linear compressor. The terminal 108 can be connected to a lead wire of a coil 141c (see FIG. 3).

A bracket 109 is disposed outside the terminal 108. The bracket 109 may include a plurality of brackets disposed around the terminal 108. The bracket 109 may perform a function of protecting the terminal 108 from external shock.

Both sides of the shell 101 are open. The shell covers 102 and 103 can be coupled to both open sides of the shell 101. In detail, the shell covers 102 and 103 include a first shell cover 102 coupled to one open side of the shell 101 and a second shell cover 103 coupled to the other open side of the shell 101. The internal space of the shell 101 can be sealed by the shell covers 102 and 103.

In FIG. 1, the first shell cover 102 may be positioned at the right side of the linear compressor 10 and the second shell cover 103 may be positioned at the left side of the linear compressor 10. That is, the first and second shell covers 102 and 103 may be arranged opposite each other.

The linear compressor 10 further includes a plurality of pipes 104, 105, and 106 disposed at the shell 101 or the shell covers 102 and 103 to suction, discharge, or inject a refrigerant. The pipes 104, 105, and 106 include a suction pipe 104, a discharge pipe 105, and a process pipe 106.

The suction pipe 104 is provided to suction a refrigerant into the linear compressor 10. For example, the suction pipe 104 may be coupled to the first shell cover 102. A refrigerant can be suctioned into the linear compressor 10 axially through the suction pipe 104.

The discharge pipe 105 is provided to discharge a compressed refrigerant out of the linear compressor 10. The discharge pipe 105 may be coupled to the outer side of the shell 101. The refrigerant suctioned through the suction pipe 104 can be compressed while axially flowing. The compressed refrigerant can be discharged through the discharge pipe 105. The discharge pipe 105 may be positioned closer to the second shell cover 103 than the first shell cover 102.

The process pipe 106 is provided to replenish the linear compressor 10 with a refrigerant. The process pipe 106 may be coupled to the outer side of the shell 101. A worker can inject a refrigerant into the linear compressor 10 through the process pipe 106.

The processor pipe 106 may be coupled to the shell 101 at a different height from the discharge pipe 105 to avoid interference with the discharge pipe 105. The height is understood as the vertical (or radial) distance from the legs 50. Since the discharge pipe 105 and the process pipe 105 are coupled at different heights to the outer side of the shell 101, a worker can conveniently work.

At least a portion of the second shell cover 103 may be positioned on the inner side of the shell 101, close to the position where the process pipe 106 is coupled. That is, at least a portion of the second shell cover 103 can act as resistance against the refrigerant that is injected through the process pipe 106.

Accordingly, in terms of a channel for a refrigerant, a channel for a refrigerant that flows inside through the process pipe 106 is formed such that the size decreases toward the inside of the shell 101. In this process, the pressure of the refrigerant is reduced, so the refrigerant may vaporize.

Further, in this process, oil contained in the refrigerant may be removed. Accordingly, a gas refrigerant with oil removed flows into a piston 130, so the performance of compressing a refrigerant can be improved. The oil may be understood as a working oil existing in a cooling system.

Figure 2:
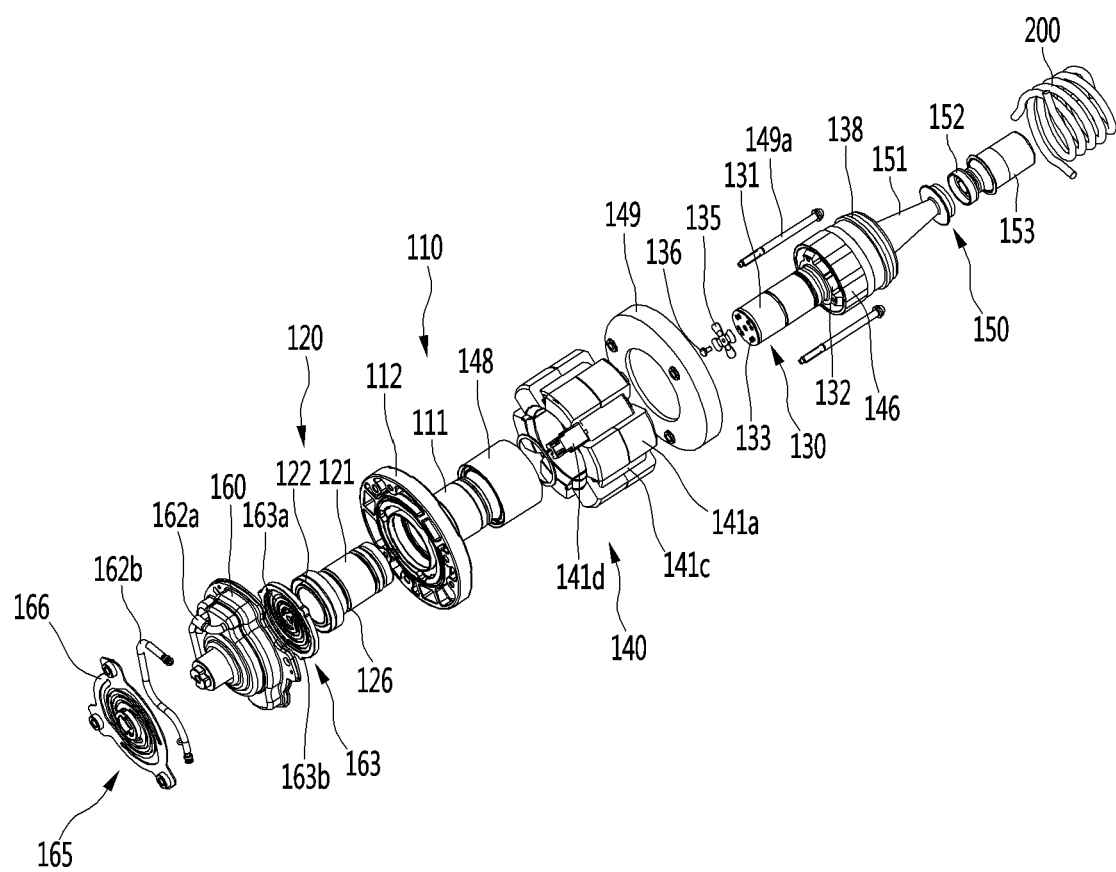
FIG. 2 is an exploded view showing the components in the linear compressor according to an embodiment of the present invention.
Figure 3:
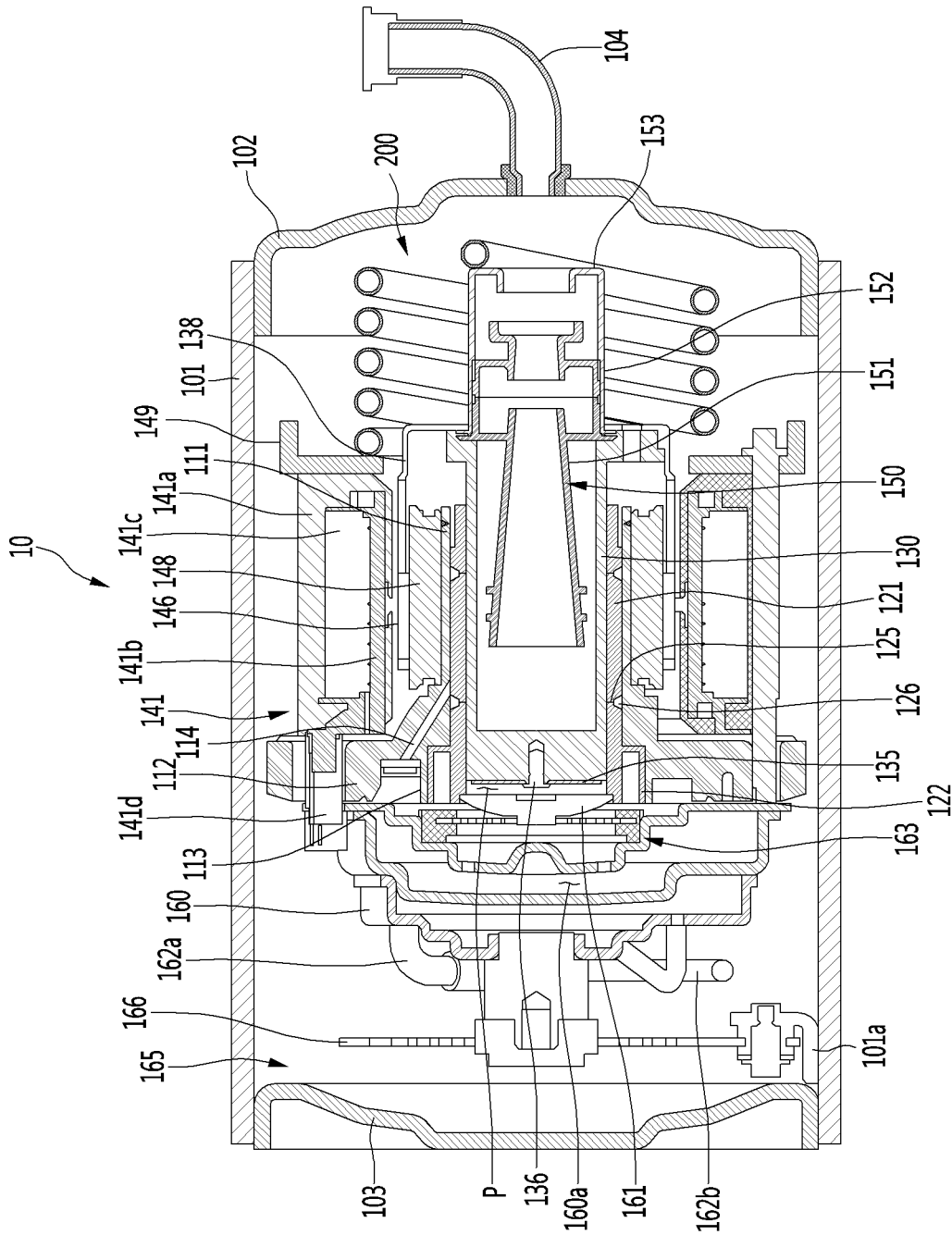
FIG. 3 is a cross-sectional view taken along line A'-A' of FIG. 1.
Figure 4:
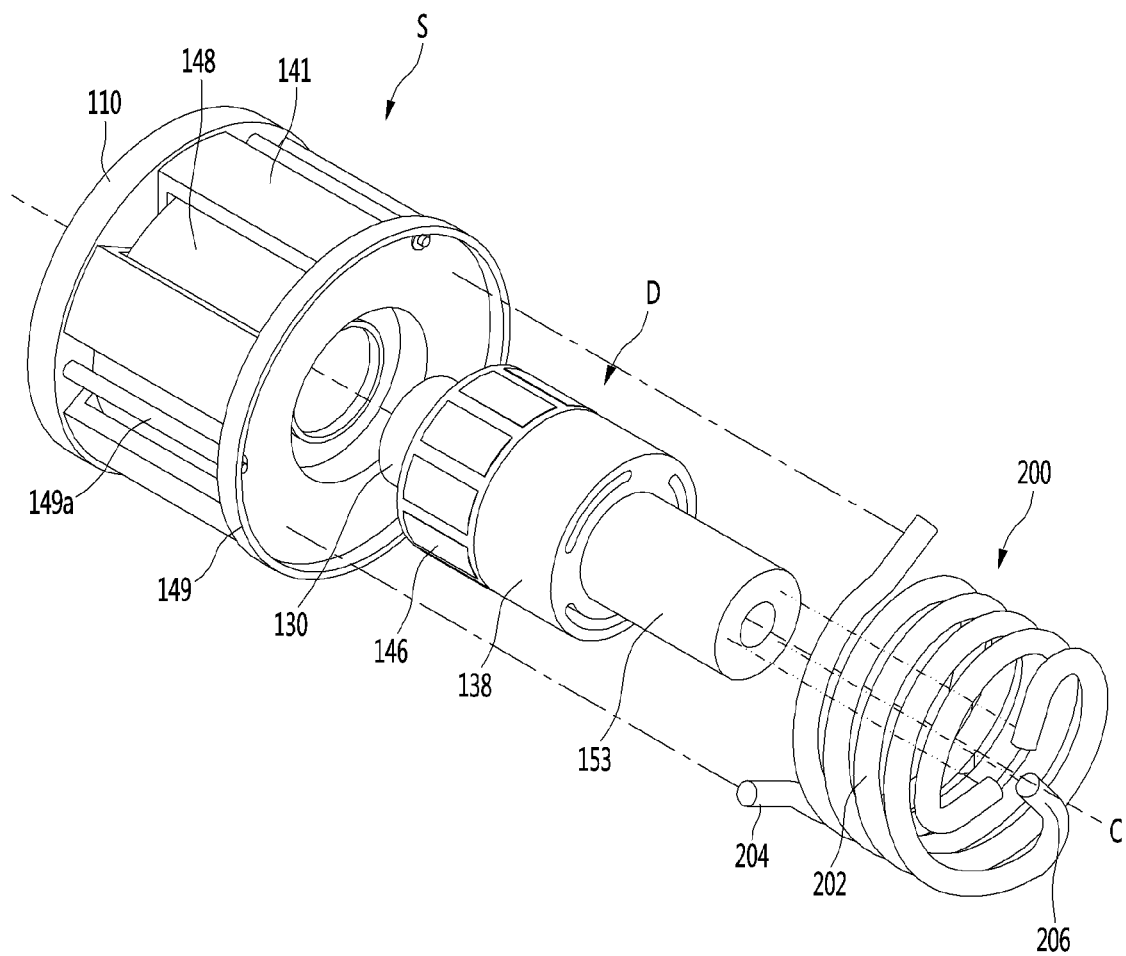
FIG. 4 is a view showing a coupling structure of the linear compressor according to an embodiment of the present invention.

FIG. 2 is an exploded view showing the components in the linear compressor according to an embodiment of the present invention and FIG. 3 is a cross-sectional view taken along line A-A' of FIG. 4. The shell 101 and the shell covers 102 and 103 are not shown in FIG. 2 for the convenience of description.

As shown in FIGS. 2 and 3, the linear compressor 10 according to an aspect of the present invention includes a frame 110, a cylinder 120, a piston 130, and a motor assembly 140. As shown in FIGS. 2 and 3, the linear compressor 10 according to an aspect of the present invention includes a frame 110, a cylinder 120, a piston 130, and a motor assembly 140. The motor assembly 140 is a linear motor that provides a driving force to the piston 130 and the piston 130 can be reciprocated by operation of the motor assembly 140.

Directions are defined as follows.

The term "axial direction" may be understood as the reciprocation direction of the piston 130, that is, the transverse direction in FIG. 3. In the "axial direction", the direction going toward the compression space P from the suction pipe 104, that is, the flow direction of a refrigerant is defined as a "forward direction" and the opposite direction is defined as a "rear direction" When the piston 130 is moved forward, the compression space P can be compressed.

Meanwhile, the term "radial direction", which is the direction perpendicular to the reciprocation direction of the piston 130, may be understood as the vertical direction in FIG. 3. In the "radial direction", the direction going toward the shell 101 from the center axis of the piston 130 is defined as a radial "outward direction" and the opposite direction is defined as a radial "inward direction".

The cylinder 120 is disposed inside the frame 110. The frame 110 is understood as a component for fixing the cylinder 120. For example, the cylinder 120 may be forcibly fitted in the frame 110.

The frame 110 includes a frame body 111 axially extending and a frame flange 112 extending radially outward from the frame body 111. The frame body 111 and the frame flange 112 may be integrated.

The frame body 111 is formed in a cylindrical shape with open axial top and bottom. The cylinder 120 is disposed radially inside the frame body 111. The frame flange 112 is formed in a disc shape having a predetermined axial thickness. In particular, the frame flange 112 radially extends from the front end of the frame body 111.

A gas hole 113 recessed rearward from the front surface of the frame flange 112 is formed on the frame flange 112. A gas channel 114 extending through the frame flange 112 and the frame body 111 from the gas hole 113 is formed in the frame 110.

The piston 130 is movably disposed in the cylinder 120. The cylinder 120 includes a cylinder body 121 axially extending and a cylinder flange 122 formed on the outer side of the front portion of the cylinder body 121.

The cylinder body 121 is formed in a cylindrical shape having a central axis and is inserted in the frame body 111. Accordingly, the outer side of the cylinder body 121 may be positioned to face the inner side of the frame body 111.

The cylinder flange 122 extends radially outward and extends forward from the front portion of the cylinder body 121. When the cylinder 120 is inserted into the frame 110, the cylinder flange 122 is deformed, so the cylinder 120 can be forcibly fitted.

A gas inlet 126 is recessed radially inward on the outer side of the cylinder body 121. The gas inlet 126 may be circumferentially formed around the outer side of the cylinder body 121 about the central axis. A plurality of gas inlets 126 may be provided. For example, two gas inlets 126 may be provided.

The cylinder body 121 includes a cylinder nozzle 125 extending radially inward from the gas inlet 126. The cylinder nozzle 125 may extend to the inner side of the cylinder body 121. That is, the cylinder nozzle 125 extends to the outside around the piston 130.

By this structure, a refrigerant that function as a gas bearing can be supplied to the piston 130. In detail, at least some of a refrigerant flows inside through the gas hole 113. Further, the refrigerant is supplied to the outside around the cylinder 120 along the gas channel 114. Further, the refrigerant can be supplied to the piston 130 through the gas inlet 126 and the cylinder nozzle 125.

The piston 130 includes a substantially cylindrical piston body 131 and a piston flange 132 radially extending from the piston body 131. The piston body 131 can reciprocate in the cylinder 120 and the piston flange 132 can reciprocate outside the cylinder 120.

The linear compressor 10 further includes a suction muffler 150 disposed in the piston 130. The suction muffler 150 is a component for reducing noise that is generated by a refrigerant suctioned through the suction pipe 104. In detail, the refrigerant suctioned through the suction pipe 104 flows into the piston 130 through the suction muffler 150. The flow noise of the refrigerant can be reduced while the refrigerant flows through the suction muffler 150.

The suction muffler 150 includes a plurality of mufflers 151, 152, and 153. The mufflers 151, 152, and 153 include a first muffler 151, a second muffler 152, and a third muffler 153 that are assembled together. The refrigerant suctioned through the suction pipe 104 can sequentially flow through the third muffler 153, the second muffler 152, and the first muffler 151.

In detail, the first muffler 151 is disposed in the piston 130 and the second muffler 152 is coupled to the rear end of the first muffler 151. The third muffler 153 receives the second muffler 152 and may extend rearward from the first muffler 151.

As shown in FIGS. 2 and 3, the first muffler 151 may be formed such that the area increases in the flow direction of a refrigerant. That is, the first muffler 151 has a tapered portion in which a flow cross-sectional area gradually increases in the flow direction of a refrigerant.

By this structure, the cross-sectional area through which a refrigerant flows gradually increases, the flow speed of the refrigerant gradually decreases, and the pressure of the refrigerant increases. Further, the pressure of the refrigerant can further increases, a suction valve 135 to be described below can be more quickly bent, and a larger amount of refrigerant can flow to the compression space P.

The compression space P, which is a space where a refrigerant is compressed by the piston 130, is defined in the cylinder 120 and ahead of the piston 130.

Suction holes 133 allowing a refrigerant to flow into the compression space P are formed at the front of the piston 130 and a suction valve 135 for selectively opening the suction holes 133 is disposed ahead of the suction holes 133. The suction valve 135 can be coupled to the piston 130 by a fastener 136.

A discharge cover 160 defining a discharge space 160a for the refrigerant discharged from the compression space P and a discharge valve assembly 161 and 163 coupled to the discharge cover 160 to selectively discharge the refrigerant compressed in the compression space P are disposed ahead of the compression space P. The discharge space 160a includes a plurality of sections divided by the inner side of the discharge cover 160. The sections are arranged in the front-rear direction and can communicate with one another.

The discharge valve assembly 161 and 163 includes a discharge valve 161 that allows a refrigerant to flow into the discharge space of the discharge cover 160 by opening when the pressure in the compression space P becomes a discharge pressure or more and a spring assembly 163 that is disposed between the discharge valve 161 and the discharge cover 160 and axially provides elasticity.

The spring assembly 163 includes a valve spring 163a and a spring fixing assembly 163b for supporting the valve spring 163a on the discharge cover 160. For example, the valve spring 163a may include a plate spring. The spring fixing assembly 163b may be integrally formed with the valve spring 163a by injection molding.

The discharge valve 161 is coupled to the valve spring 163a and the rear portion or the rear surface of the discharge valve 161 is disposed to be able to be supported on the front surface of the cylinder 120. When the discharge valve 161 is supported on the front surface of the cylinder 120, the compression space P is maintained in a sealed state, and when the discharge valve 161 is spaced from the front surface of the cylinder 120, the compression space P is opened and the compressed refrigerant in the compression space P can be discharged.

The linear compressor 10 further includes a retainer 165 coupled to the discharge cover 160 and supporting a side of the body of the compressor 10. The retainer 165 is disposed close to the second shell 103 and can elastically support the body of the compressor 10.

In detail, the retainer 165 includes a supporting spring 166. A spring holder 101a may be disposed on the inner side of the shell 101, close to the second shell cover 103. The supporting spring 166 may be coupled to the spring holder 101a. Since the spring holder 101a and the retainer 165 are coupled to each other, the body of the compressor can be stably supported in the shell 101.

The compression space P can be understood as a space defined between the suction valve 135 and the discharge valve 161. The suction valve 135 may be formed at a side of the compression space P and the discharge valve 161 may be disposed at the other side of the compression space P, that is, opposite the suction valve 135.

When the pressure in the compression space P decreases to a suction pressure or less and lower than a discharge pressure while the piston 130 reciprocates in the cylinder 120, the suction valve 135 is opened and a refrigerant is suctioned into the compression space P. However, when the pressure in the compression space P increases to the suction pressure or more, the refrigerant in the compression space P is compressed with the suction valve 135 closed.

When the pressure in the compression space P increases to the discharge pressure or more, the valve spring 163a opens the discharge valve 161 by deforming forward and a refrigerant is discharged from the compression space P into the discharge space 160 of the discharge cover 160. When the refrigerant finishes being discharged, the valve spring 163a provides a restoring force to the discharge valve 161, so the discharge valve 161 is closed.

The linear compressor 10 further includes a cover pipe 162a coupled to the discharge cover 160 to discharge the refrigerant flowing through the discharge space 160a of the discharge cover 160. For example, the cover pipe 162a may be made of metal.

The linear compressor 10 further includes a loop pipe 162b coupled to the cover pipe 162a to transmit the refrigerant flowing through the cover pipe 162a to the discharge pipe 105. The loop pipe 612b may be coupled to the cover pipe 162a at a side and to the discharge pipe 105 at the other side.

The loop pipe 162b is made of a flexible material and may have a relatively large length. The loop pipe 162b may be rounded along the inner side of the shell 101 from the cover pipe 162a and coupled to the discharge pipe 105. For example, the loop pipe 162b may be wound.

The motor assembly 140 includes an outer stator 141 fixed to the frame 110 around the cylinder 120, an inner stator 148 spaced apart inward from the outer stator 141, and a permanent magnet 146 disposed in the space between the outer stator 141 and the inner stator 148.

The permanent magnet 146 can be reciprocated straight by a mutual electromagnetic force with the outer stator 141 and the inner stator 148. The permanent magnet 146 may be a single magnet having one pole or may be formed by combining a plurality of magnets having three poles.

The permanent magnet 146 may be disposed on a magnet frame 138. The magnet frame 138 may have a substantially cylindrical shape and may be inserted in the space between the outer stator 141 and the inner stator 148.

In detail, on the basis of the cross-sectional view of FIG. 3, the magnet frame 138 may extend radially outward from the rear side of the piston 130 and may bend forward. The permanent magnet 146 may be disposed at the rear portion of the magnet frame 138. When the permanent magnet 146 reciprocates, the piston 130 can axially reciprocate with the permanent magnet 146.

The outer stator 141 includes a coil assembly 141b, 141c, and 141d and a stator core 141a. The coil assembly 141b, 141c, and 141d includes a bobbin 141b and a coil 141c circumferentially wound around the bobbin.

The coil assembly 141b, 141c, and 141d further includes a terminal 141d leading or exposing a power line connected to the coil 141c to the outside of the outer stator 141. The terminal 141d can be led or exposed to the outside through the front from the rear of the frame 110 through the frame flange 112.

The stator core 141a includes a plurality of core blocks formed by circumferentially stacking a plurality of laminations. The core blocks may be arranged around at least a portion of the coil assembly 141b and 141c.

A stator cover 149 is disposed at a side of the outer stator 141. In the outer stator 141, a side may be supported by the frame 110 and the other side may be supported by the stator cover 149.

The linear compressor 10 further includes cover fasteners 149a for fastening the stator cover 149 and the frame 110. The cover fasteners 149a may extend forward toward the frame 110 through the stator cover 149 and may be coupled to the frame 110.

The inner stator 148 is fixed to the outer side of the frame 110. The inner stator 148 is formed by stacking a plurality of laminations circumferentially outside the frame 110.

That is, the inner stator 148 is coupled to the radial outer side of the frame body 111. The inner stator 148 disposed on the radial outer side of the frame body 111, the permanent magnet 146, and the outer stator 141 are disposed axially behind the frame flange 112.

The configuration of the linear compressor 10 may include a configuration that reciprocates and a configuration that supports the reciprocating configuration. The linear compressor 10 according to an aspect of the present invention includes a spring 200 elastically supporting the reciprocating configuration. The spring 200 is described in detail hereafter.

FIG. 4 is a view showing a coupling structure of the linear compressor according to an embodiment of the present invention.

As shown in FIG. 4, the linear compressor includes a driving assembly D and a supporting assembly S. The supporting assembly may be referred to as a fixed assembly.

The driving assembly D can be understood as an assembly of components that reciprocate in the compressor 10. Accordingly, the driving assembly D includes the piston 130, the permanent magnet 146, the magnet frame 138, and the suction muffler 150.

The supporting assembly S can be understood as a configuration that does not reciprocate in the compressor 10. Accordingly, the supporting assembly S can also be understood as a configuration that is not the driving assembly D in the shell 101.

The supporting assembly S is a configuration that supports motions of the driving assembly D. In detail, the supporting assembly S supports the driving assembly D in the shell 101. Accordingly, the driving assembly D can reciprocate at a predetermined distance from the shell 101.

Referring to FIG. 4, the supporting assembly S includes the frame 110, the outer stator 141, the inner stator 148, and the stator cover 149. For the convenience of illustration, the discharge cover 160, etc. that are coupled to the upper portion of the frame 110 are not shown.

The above description is referred to for the components of the driving assembly D and the supporting assembly S and the combination of the components. Further, the driving assembly D and the supporting assembly S are discriminated on the basis of the above description and they may be discriminated in different ways when other configurations are added to or removed from the linear compressor 10.

The spring 200 can be understood as a resonant spring for stable reciprocation of the driving assembly D. In particular, the spring 200 can reduce vibration or noise due to movement of the driving assembly D.

Accordingly, the spring 200 can be axially stretched and compressed. In other words, the spring 200 can reduce vibration or noise due to movement of the driving assembly D, using tensile force or compressive force. For example, the spring 200 may have the shape of a coil spring that is axially stretched or compressed.

Referring to FIG. 3, the spring 200 is disposed close to the first shell cover 102. In particular, the spring 200 may be disposed behind the piston 130. That is, the spring 200 can be understood as a structure that supports the driving assembly D axially behind it. A separate retainer may be further provided between the spring 200 and the first shell cover 102.

The spring 200 connects the driving assembly D and the supporting assembly S. That is, the spring 200 can be combined with the driving assembly D and the supporting assembly S.

Different combination lines are provided to discriminate the combinations of the configurations in FIG. 4. In detail, the combination line of the spring 200 and the driving assembly S is shown as a dot-dashed line. In detail, the combination line of the spring 200 and the supporting assembly S is shown as a double-dot-dashed line.

In particular, an end of the spring 200 can be fixed with the driving assembly D and the other end of the spring 200 can be fixed with the supporting assembly S. Accordingly, the spring 200 is disposed with both ends fixed. Therefore, in the linear compressor 10 according to an aspect of the present invention, both of tensile force and compressive force of the spring 200 can be used.

Referring to FIG. 4, an end of the spring 200 is fixed to the stator cover 149 and the other end of the spring 200 is fixed to the suction muffler 150. For example, the spring 200 can be fixed to the stator cover 149 and the suction muffler 150 by welding.

However, this coupling is just an example. In short, the spring 200 can connect at least one component of the driving assembly D and at least one component of the supporting assembly S. In particular, any one of both ends of the spring 200 is fixed to the driving assembly D and the other one is fixed to the supporting assembly S.

The operation of the compressor 10 according to this coupling structure is briefly described. When the compressor 10 is operated, the driving assembly D reciprocates. Accordingly, the end of the spring 200 fixed to the driving assembly D also reciprocates. The end of the spring 200 fixed to the supporting assembly S is fixed at a predetermined position in this process.

Accordingly, when the driving assembly D moves forward, both ends of the spring 200 move away from each other, whereby the spring 200 is stretched. On the other hand, when the driving assembly D moves rearward, both ends of the spring 200 move close to each other, whereby the spring 200 is compressed. As the spring 200 is stretched or compressed, as described above, the driving assembly D can be elastically supported.

As shown in FIG. 4, the spring 200 is a coil spring that is axially stretched and compressed. In detail, the spring 200 axially spirally extends. Accordingly, the spring 200 can form a virtual circle having a spring diameter R (see FIG. 6) in the radial direction.

The center of the spring diameter R is referred to as a spring center and a line axially extending from the spring center is referred to as a spring central axis C. The central axis of the linear compressor 10 according to an aspect of the present invention and the spring central axis C coincide.

The central axis of the compressor 10 can be understood as the central axis of the configuration of the compressor 10. For example, the central axis may be central axes of the cylindrical shell 101, the frame body 111, the cylinder body 121, and the piston body 131. Eccentricity due to operation and design errors are not considered in this case.

In particular, the spring central axis C coincides with the reciprocation central axis of the driving assembly D. Accordingly, force except for axial tensile or compressive force can be minimized when the spring 200 supports the driving assembly D. That is, lateral force can be minimized, so the spring 200 can effectively support the driving assembly D.

The suction muffler 150 is disposed inside the spring 200. In detail, the spring 200 axially extends around the suction muffler 150. In particular, the spring 200 spirally extends radially outside the third muffler 153.

Accordingly, the spring diameter R is larger than the diameter of the suction muffler 150. Further, the spring diameter R may be larger than the diameter of the piston flange 132 or the magnet frame 138. That is, the spring 200 has a relatively large diameter.

Accordingly, rigidity of the spring 200 is increased and the spring 200 can resist better repetitive load due to reciprocation. As the supporting force of the spring 200 is increased, the driving assembly can be operated at a high speed.

Further, since the spring 200 is disposed around the suction muffler 150, the internal space of the compressor 10 can be effectively used. In particular, the rear cover, etc. of the linear compressors of the related art can be removed, so the axial length of the compressor 10 can be reduced.

The spring 200 can be divided into a spring body 202 and end portions of the spring body 202.

In detail, the spring body 202 axially extends while radially forming a circle having the spring diameter R. Accordingly, the spring body 202 can be formed in a spiral shape axially extending. In other words, the spring body 202 extends with a curvature that radially forms the spring diameter R.

Both end portions of the spring body 202 extend with a radially different curvature from the spring diameter R. Accordingly, both ends of the spring body 202 are positioned radially outside or inside the spring body 202.

For the convenience of description, the end positioned axially ahead of the spring body 202 is referred to as a front spring link 204 and the end positioned axially behind the spring body 202 is referred to as a rear spring link 206. Accordingly, in FIG. 4, the portion positioned at the left side is the front spring link 204 and the portion positioned at the right side is the rear spring link 206.

Further, as indicated by combination lines in FIG. 4, the front spring link 204 is coupled to the supporting assembly S and the rear spring link 206 is coupled to the driving assembly D. In particular, the front spring link 204 is coupled to the rear surface of the stator cover 149 and the rear spring link 206 is coupled to the rear end of the third muffler 153.

However, this is just an example, and any one of both end portions of the spring 200 may be coupled to the supporting assembly S and the other one may be coupled to the driving assembly D.

The coupling structure of the spring 200 is described in detail hereafter.

Figure 5:
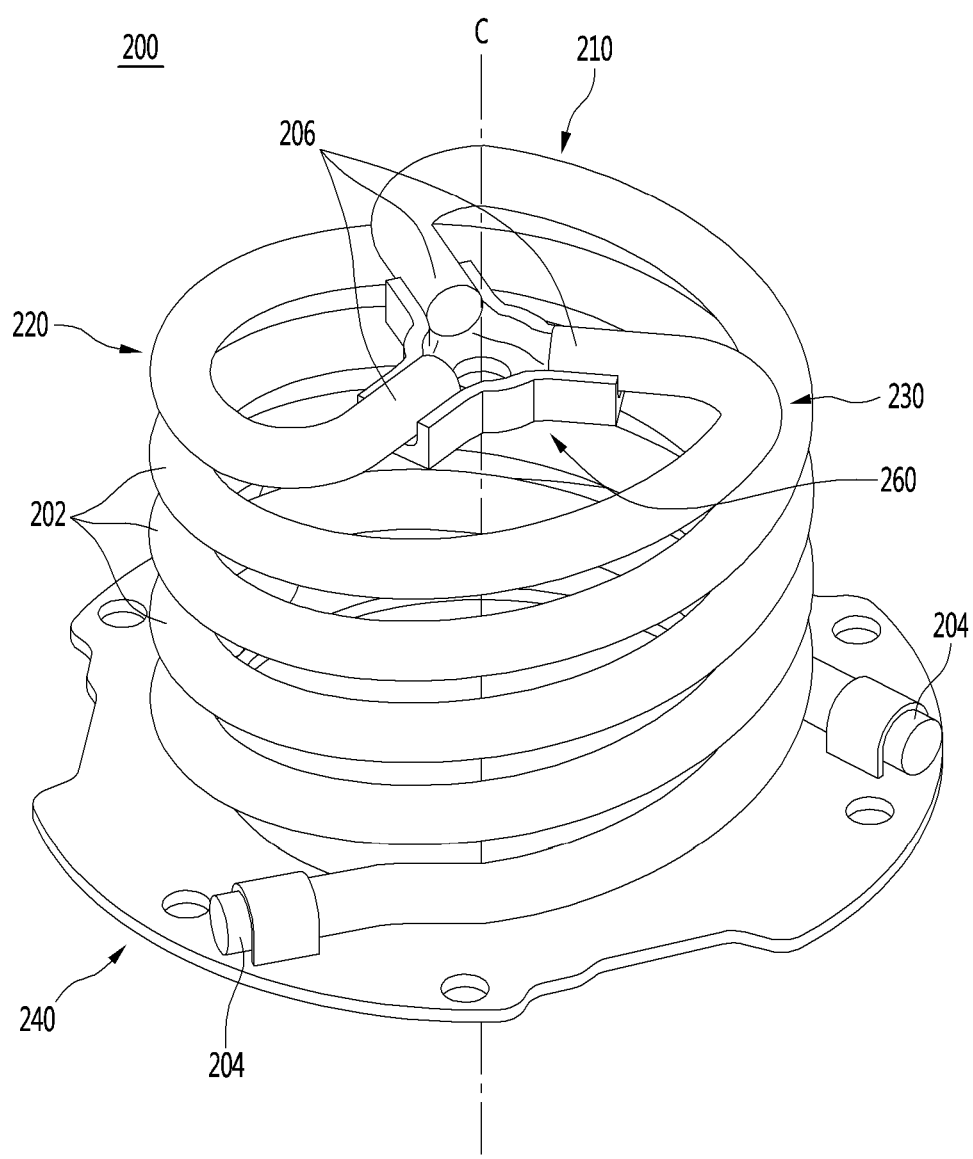
FIGS. 5 and 6 are views showing a spring of a linear compressor according to a first embodiment of the present invention.
Figure 6:
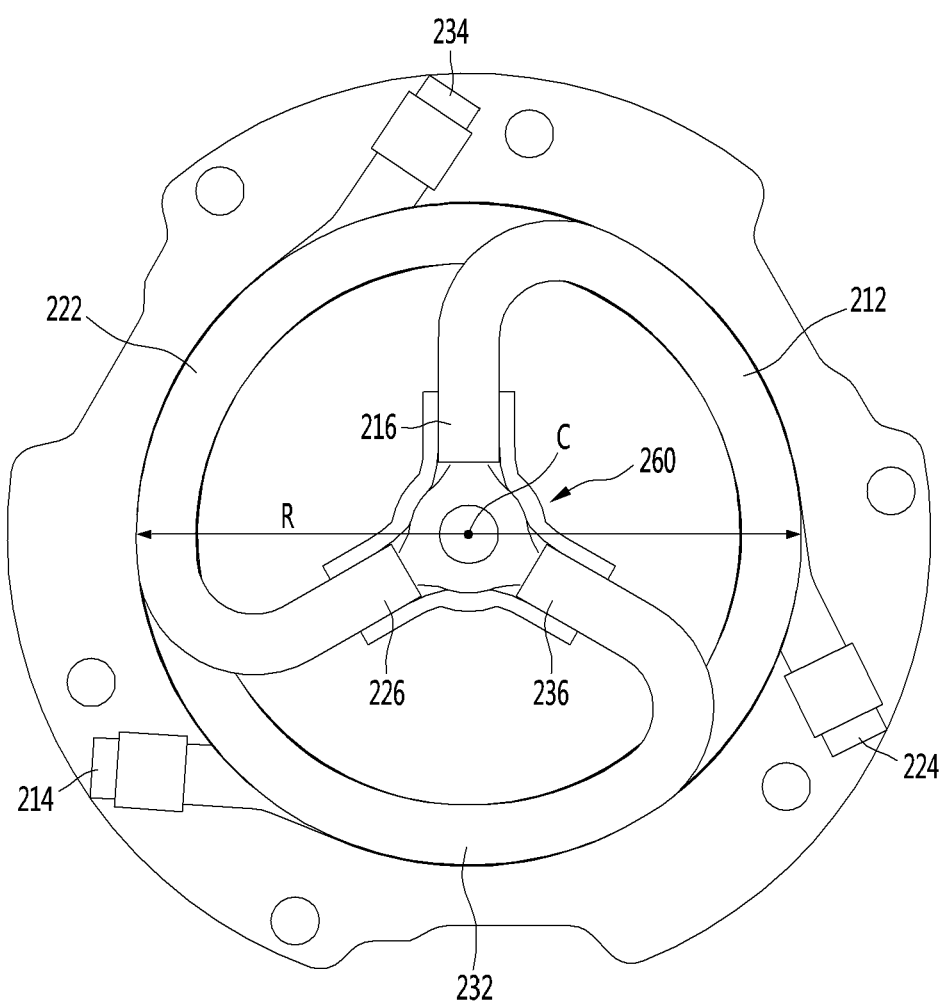

FIGS. 5 and 6 are views showing a spring of a linear compressor according to a first embodiment of the present invention.

As shown in FIGS. 5 and 6, the spring 200 includes a first bracket 240 coupled to the front spring link 204 and a second bracket 260 coupled to the rear spring link 206. The first bracket 240 and the second bracket 260 are understood as components that fix the spring 200 to the driving assembly D or the supporting assembly S.

The first bracket 240 may be a flat plate radially extending. Accordingly, the first bracket 240 can form one plane perpendicular to the axial direction. The first bracket 240 may have a portion that protrudes axially rearward to fix the front spring link 204.

For example, the first bracket 240 can be coupled to the stator cover 149. Accordingly, the first bracket 240 may be a ring-shaped flat plate corresponding to the stator cover 149. An opening for avoiding the cover fasteners 149a coupled to the stator cover 149 may be formed at the first bracket 240.

The second bracket 260 may be formed in a flat plate shape radially extending with the edge axially bending. The second bracket 260 forms one plane perpendicular to the axial direction. In particular, the second bracket 260 bends axially rearward around at least a portion of the rear spring link 206.

For example, the second bracket 260 can be coupled to the suction muffler 150. In detail, the second bracket 260 can be coupled to the rear surface of the third muffler 153 into which a refrigerant flows. Accordingly, a hole for flow of a refrigerant may be formed at the second bracket 260.

The spring 200 is composed of a plurality of spring strands. In particular, the spring 200 according to the linear compressor 10 according to an aspect of the present invention may be composed of three spring strands 210, 220, and 230.

The term 'spring strands' is used for the convenience of description, but the spring strands 210, 220, and 230 are not a part of a spring, but complete products. In other words, the spring 200 of the present invention can be understood as being formed by combining a plurality of springs.

The spring strands 210, 220, and 230 are the same. In detail, the spring strands 210, 220, and 230 may be the same in shape and size. That is, the spring strands may be made of the same material through the same manufacturing process.

For the convenience of description, the spring strands are respectively referred to as a first spring strand 210, a second spring strand 220, and a third spring strand 230.

The first, second, and third spring strands 210, 220, and 230 are circumferentially differently turned. The term 'circumferential' means any one of 'clockwise' and 'counter-clockwise'. The first, second, and third spring strands 210, 220, and 230 are circumferentially turned at the same angle. That is, the spring strands 210, 220, and 230 are turned at 120 degrees with respect to one another.

For example, assuming that the first spring strand 210 is the center (0 degrees or 360 degrees), the second spring strand 220 is positioned circumferentially at 120 degrees from the first spring strand 210. Further, the third spring strand 230 is positioned at 240 degrees from the first spring strand 210 and at 120 degrees from the second spring strand 220.

The spring strands 210, 220, and 230 are each divided into a spring body and both ends (a front spring link and a rear spring link). The lengths of the spring bodies, the lengths of both ends, and bending angles of the spring strands 210, 220, and 230 are the same.

In detail, the first spring strand 210 is divided into a first spring body 212, a first front spring link 214, and a first rear spring link 216. The second spring strand 220 is divided into a second spring body 222, a second front spring link 224, and a second rear spring link 226. The third spring strand 230 is divided into a third spring body 232, a third front spring link 234, and a third rear spring link 236.

The first, second, and third spring bodies 212, 222, and 232 extend with the same spring diameter R. Accordingly, the entire shape of the spring body 202 can be a cylindrical shape. In detail, a cylindrical shape axially extending and having the spring diameter R radially from the spring central axis C is formed.

The first, second, and third front spring links 214, 224, and 234 bend radially outward. In other words, the first, second, and third front spring links 214, 224, and 234 are disposed radially outside the spring body 202.

The first bracket 240 is coupled to the first, second, and third front spring links 214, 224, and 234. That is, the first bracket 240 can be understood as a component that fixes the front spring links 214, 224, and 234 axially in the same plane.

As described above, the first bracket 240 may be formed in a ring shape. Accordingly, the first bracket 240 has an outer diameter and an inner diameter with respect to the central axis C.

The outer diameter of the first bracket 240 is larger than the spring diameter R. For example, the outer diameter of the first bracket 240 may correspond to a virtual circle constructed by circumferentially extending the radial outermost ends of the first, second, and third front spring links 214, 224, and 234.

The inner diameter of the first bracket 240 is smaller than the spring diameter R. Accordingly, when the spring 200 is compressed, the first bracket 240 can support at least a portion of the spring body 202.

The first, second, and third rear spring links 216, 226, and 236 bend radially inward. In other words, the first, second, and third rear spring links 216, 226, and 236 are disposed radially inside the spring body 202. The first, second, and third rear spring links 216, 226, and 236 can be understood as extending toward the central axis C.

The second bracket 260 is coupled to the first, second, and third rear spring links 216, 226, and 236. That is, the second bracket 260 can be understood as a component that fixes the rear spring links 216, 226, and 236 axially in the same plane.

The second bracket 260 radially protrudes at 120 degrees around the central axis C. The second bracket 260 radially protrudes from the central axis to fix the first, second, and third rear spring links 216, 226, and 236 circumferentially spaced apart from one another at 120 degrees.

The bending angles or lengths of the first, second, and third front spring links 214, 224, and 234 and the first, second, and third rear spring links 216, 226, and 236 may be different, depending on design. In particular, the bending angles or lengths may be different, depending on the coupling structures of the first, second, and third front spring links 214, 224, and 234 and the first, second, and third rear spring links 216, 226, and 236.

As described above, the spring of the present invention may include a plurality of spring strands and a pair of brackets connecting the spring strands. The spring strands and the pair of brackets may be changed in various shapes. Exemplary shapes of the spring strands and the pair of brackets are described hereafter. The above description is referred to for the same configuration and the same components are indicated by different reference numerals for the convenience of understanding.

Figure 7:
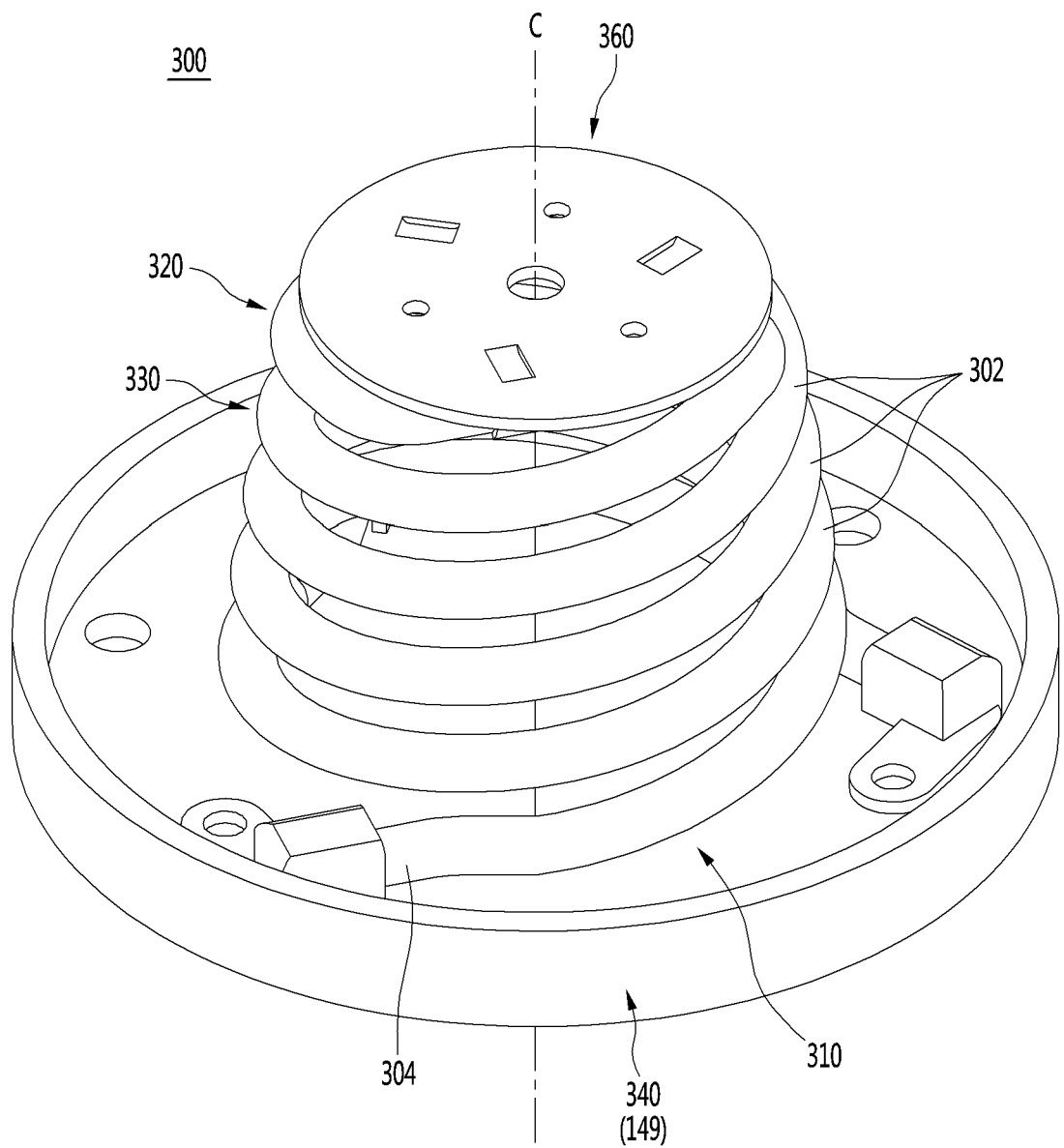
FIGS. 7 and 8 are views showing a spring of a linear compressor according to a second embodiment of the present invention.
Figure 8:
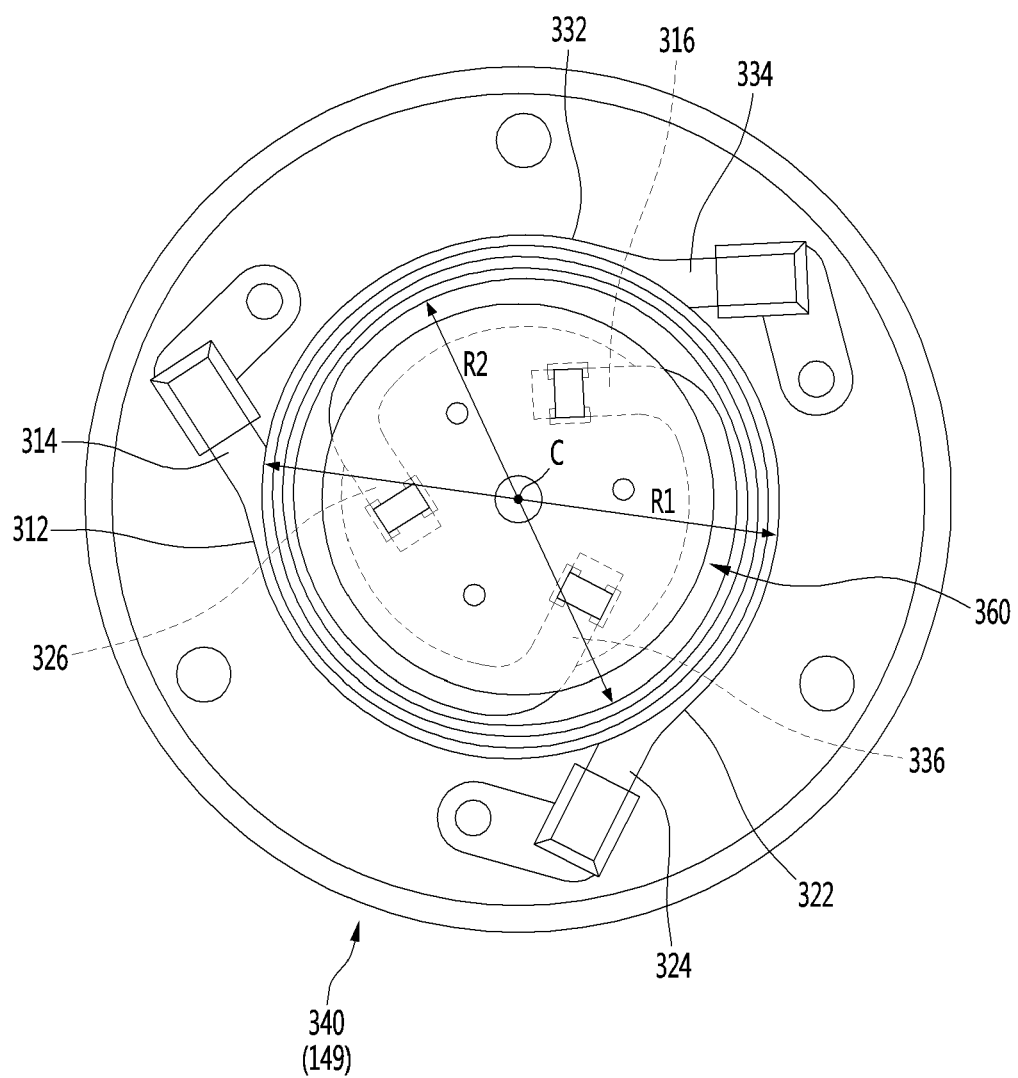

FIGS. 7 and 8 are views showing a spring of a linear compressor according to a second embodiment of the present invention.

As shown in FIGS. 7 and 8, a spring 300 includes a first bracket 340 coupled to a front spring link 304 and a second bracket 360 coupled to a rear spring link 306.

The first bracket 340 may be a flat plate radially extending. Accordingly, the first bracket 340 can form one plane perpendicular to the axial direction. The first bracket 340 may have a portion that protrudes axially rearward to fix the front spring link 204.

The first bracket 340 may be the stator cover 149. That is, the stator cover 149 itself can function as the first bracket 340. Accordingly, the first bracket 340 supports a side of the outer stator 131 and is coupled to the frame 110 by the cover fasteners 149a.

In other words, the first bracket 340 can be understood as not being provided. Accordingly, the front spring link 306 can be understood as being directly coupled to the stator cover 149. In FIGS. 7 and 8, both reference numerals are shown to show that the first bracket 340 and the stator cover 149 are the same component.

The second bracket 360 may be a flat plate radially extending. Accordingly, the second bracket 360 can form one plane perpendicular to the axial direction. The second bracket 360 may have a portion that protrudes axially forward to fix the rear spring link 206.

For example, the second bracket 360 can be coupled to the suction muffler 150. In detail, the second bracket 260 can be coupled to the rear surface of the third muffler 153 into which a refrigerant flows. Accordingly, a hole for flow of a refrigerant may be formed at the second bracket 360.

The spring 300 is composed of a plurality of spring strands 310, 320, and 330. The spring 300 is divided into a spring body 302 spirally extending and both ends (hereafter, a front spring link 304 and a rear spring link 306) of the spring body 302.

The spring strands have the same shape and are circumferentially spaced apart from one another with the same intervals. The spring strands include a first spring strand 310, a second spring strand 320, and a third spring strand 330.

The first, second, and third spring strands 310, 320, and 330 are circumferentially differently turned. The term 'circumferential' means any one of 'clockwise' and 'counterclockwise'. The first, second, and third spring strands 310, 320, and 330 are circumferentially turned at the same angle. That is, the spring strands 310, 320, and 330 are turned at 120 degrees with respect to one another.

The spring strands 310, 320, and 330 are each divided into a spring body and both ends (a front spring link and a rear spring link). In detail, the first spring strand 310 is divided into a first spring body 312, a first front spring link 314, and a first rear spring link 316. The second spring strand 320 is divided into a second spring body 322, a second front spring link 324, and a second rear spring link 326. The third spring strand 330 is divided into a third spring body 332, a third front spring link 334, and a third rear spring link 336.

The first, second, and third spring bodies 310, 320, and 330 extend while each forming a virtual circle having a spring diameter R in the radial direction. The center of the spring diameter R is referred to as a spring center and a line axially extending from the spring center is referred to as a spring central axis C. The spring central axis C coincides with a reciprocation central axis of the driving assembly including the piston 130.

The first, second, and third spring bodies 310, 320, and 330 extend such that the spring diameter R is radially changed. Referring to FIG. 8, the spring body 302 close to the front spring link 304 has a first spring diameter R1 and the spring body 302 close to the rear spring link 306 has a second spring diameter R2.

The second spring diameter R2 is smaller than the first spring diameter R1. That is, the spring body 302 extends such that the spring diameter decreases from the axial front portion to rear portion.

Accordingly, the entire shape of the spring body 302 can be a circular conical shape. In detail, it is a frustoconical shape. Accordingly, an end of the spring body 302 has the first spring diameter R1 in the radial direction and the other end of the spring body 302 has the second spring diameter R2 in the radial direction with respect to the spring central axis C. Further, the spring body 302 axially extends by a spring height H.

The first spring diameter R1 and the second spring diameter R2 are coaxially defined. That is, the centers of the first spring diameter R1 and the second spring diameter R2 are the same and a line axially extending from the centers is the spring central axis C.

The first, second, and third front spring links 314, 324, and 334 bend radially outward. In other words, the first, second, and third front spring links 314, 324, and 334 are disposed radially outside the spring body 302.

The first bracket 340 is coupled to the first, second, and third front spring links 314, 324, and 334. That is, the first bracket 340 can be understood as a component that fixes the front spring links 314, 324, and 334 axially in the same plane.

Further, as described above, the first bracket 340 is the stator cover 149. Accordingly, the first bracket 340 is formed in a ring shape having an outer diameter and an inner diameter with respect to the central axis C and the edge of the first bracket 340 may extend axially rearward.

The outer diameter of the first bracket 340 is larger than the spring diameter R and smaller than the inner diameter of the shell 101. Accordingly, the radial outermost ends of the first, second, and third front spring links 314, 324, and 334 can be seated inside the first bracket 240.

The inner diameter of the first bracket 340 is smaller than the spring diameter R. Accordingly, when the spring 300 is compressed, the first bracket 340 can support at least a portion of the spring body 302.

The first, second, and third rear spring links 316, 326, and 336 bend radially inward. In other words, the first, second, and third rear spring links 316, 326, and 336 are disposed radially inside the spring body 302. The first, second, and third rear spring links 316, 326, and 336 can be understood as extending toward the central axis C.

The second bracket 360 is coupled to the first, second, and third rear spring links 316, 326, and 336. That is, the second bracket 360 can be understood as a component that fixes the rear spring links 316, 326, and 336 axially in the same plane. The second bracket 360 may be a circular flat plate radially extending from the central axis C.

As described above, the spring of the present invention may have different spring diameters R in the radial direction and may have various shapes of brackets.

Figure 9:
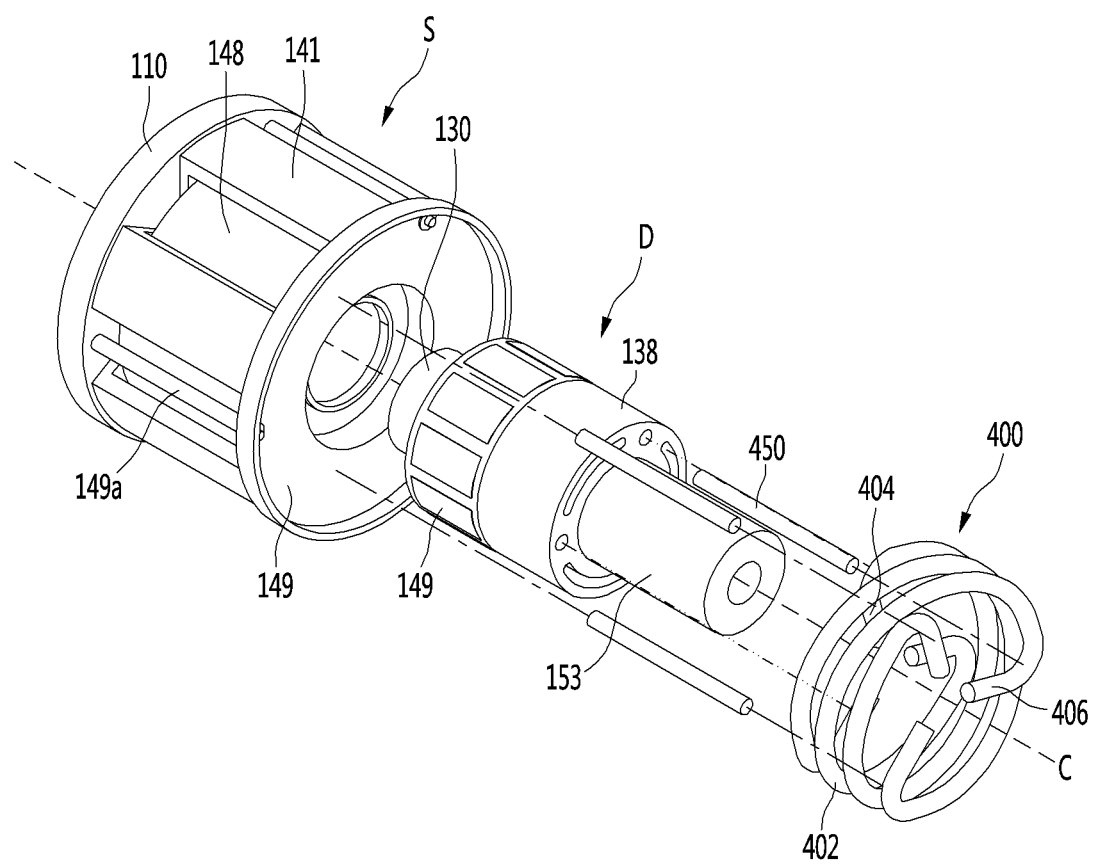
FIG. 9 is a view showing a coupling structure of a linear compressor according to another embodiment of the present invention.

FIG. 9 is a view showing a coupling structure of a linear compressor according to another embodiment of the present invention.

As shown in FIG. 9, the linear compressor includes a spring 400, a driving assembly D, and a supporting assembly S. The driving assembly D and the supporting assembly S shown in FIG. 9 are the same as those shown in FIG. 4. Accordingly, they are not described and the description referring to FIG. 4 is substituted.

The spring 400 connects the driving assembly D and the supporting assembly S. That is, the spring 400 can be combined with the driving assembly D and the supporting assembly S.

Different combination lines are provided to discriminate the combinations of the configurations in FIG. 9. In detail, the combination line of the spring 400 and the supporting assembly S is shown as a dot-dashed line. In detail, the combination line of the spring 200 and the supporting assembly S is shown as a double-dot-dashed line.

In particular, an end of the spring 400 can be fixed with the driving assembly D and the other end of the spring 400 can be fixed with the supporting assembly S. Accordingly, the spring 400 is disposed with both ends fixed. Therefore, in the linear compressor 10 according to an aspect of the present invention, both of tensile force and compressive force of the spring 400 can be used.

Referring to FIG. 9, an end of the spring 400 is fixed to the stator cover 149 by predetermined spring fasteners 450. The other end of the spring 400 is fixed to the magnet frame 138. For example, the spring 400 can be directly or indirectly fixed to the stator cover 149 and the magnet frame 138 by welding.

However, this coupling is just an example. In short, the spring 400 can connect at least one component of the driving assembly D and at least one component of the supporting assembly S. In particular, any one of both ends of the spring 400 is fixed to the driving assembly D and the other one is fixed to the supporting assembly S.

As shown in FIG. 9, the spring 400 is a coil spring that is axially stretched and compressed. In detail, the spring 400 axially spirally extends. The spring 400 spirally extends around the spring central axis C.

The central axis of the linear compressor 10 according to an aspect of the present invention and the spring central axis C coincide. In particular, the spring central axis C coincides with the reciprocation central axis of the driving assembly D.

The suction muffler 150 is disposed inside the spring 400. In detail, the spring 400 axially extends around the suction muffler 150. In particular, the spring 400 spirally extends radially outside the third muffler 153.

The spring 400 can be divided into a spring body 402 and end portions of the spring body 402. For the convenience of description, the end positioned axially ahead of the spring body 402 is referred to as a front spring link 404 and the end positioned axially behind the spring body 402 is referred to as a rear spring link 406.

Further, as indicated by combination lines in FIG. 9, the front spring link 404 is coupled to the driving assembly D and the rear spring link 406 is coupled to the supporting assembly S. In particular, the front spring link 404 is coupled to the rear end of the magnet frame 130 and the rear spring link 406 is coupled to the rear end of the stator cover 149.

Further, it can be seen that the spring body 402 is positioned axially behind the magnet frame 138 and the stator cover 149. The spring body 402 may have a diameter larger than the magnet frame 138. That is, the spring body 402 may be disposed radially outside the magnet frame 138.

That is, as compared with the spring 200 shown in FIG. 4, the front spring link 404 and the rear spring link 406 may be coupled to the driving assembly D and the supporting assembly S while crossing each other.

The coupling structure of the spring 400 shown in FIG. 9 is described in detail hereafter.

Figure 10:
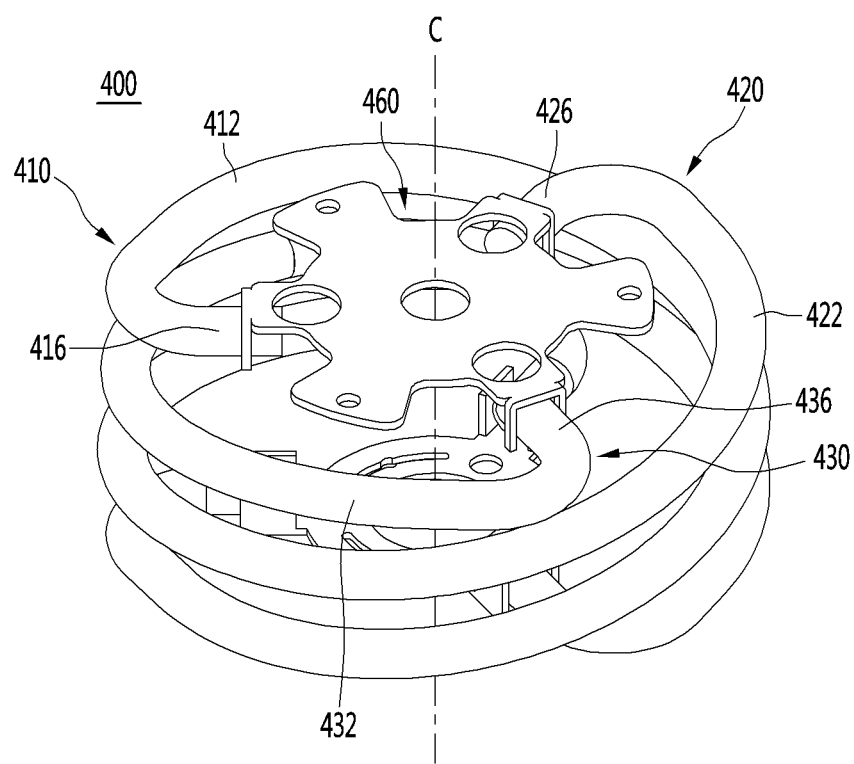
FIGS. 10 and 11 are views showing a spring of a linear compressor according to a third embodiment of the present invention.
Figure 11:
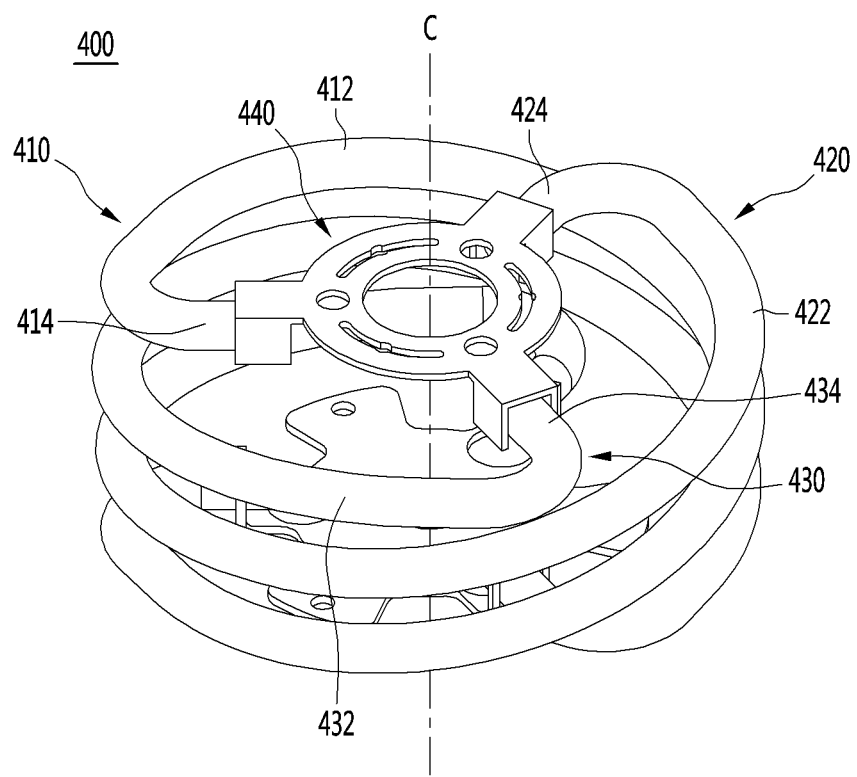

FIGS. 10 and 11 are views showing a spring of a linear compressor according to a third embodiment of the present invention. Referring to FIGS. 10 and 11, a linear compressor according to the third embodiment is shown in a front perspective view and a rear perspective view, unlike other embodiments, to effectively show the configuration of a spring.

As shown in FIGS. 10 and 11, the spring 400 includes a first bracket 440 coupled to the front spring link 404 and a second bracket 460 coupled to the rear spring link 406. The first bracket 440 and the second bracket 460 are understood as components that fix the spring 400 to the driving assembly D or the supporting assembly S.

The first bracket 440 may be a flat plate radially extending. Accordingly, the first bracket 440 can form one plane perpendicular to the axial direction. The first bracket 440 may have a portion that protrudes axially rearward to fix the front spring link 404.

For example, the first bracket 440 can be coupled to the magnet frame 138. In particular, the first bracket 440 can be coupled to a portion where the magnet frame 138 extends radially outward from the rear portion of the piston 130. That is, the first bracket 140 can be coupled to the rear end of the magnet frame 138.

Accordingly, the first bracket 440 may be a ring-shaped flat plate corresponding to the rear end of the magnet frame 138. An opening for avoiding the third muffler 153 coupled to center portion of the rear end of the magnet frame 138 may be formed at the first bracket 340.

The second bracket 460 may be a flat plate radially extending. Accordingly, the second bracket 460 can form one plane perpendicular to the axial direction. The second bracket 460 may have a portion that protrudes axially forward to fix the rear spring link 406.

For example, the second bracket 460 can be coupled to the stator cover 149. The spring fasteners 450 are coupled between the second bracket 460 and the stator cover 149. That is, the second bracket 460 is indirectly coupled to the stator cover 149.

A plurality of spring fasteners 450 axially extending may be provided. Referring to FIG. 9, three spring fasteners 450 are provided and are circumferentially spaced apart from one another at 120 degrees. Accordingly, the second bracket 460 can be coupled and supported to the stator cover 149 at three points.

The spring 400 is composed of a plurality of spring strands 410, 420, and 430. The spring 400 is divided into a spring body 402 spirally extending and both ends (hereafter, a front spring link 404 and a rear spring link 406) of the spring body 402.

The spring strands have the same shape and are circumferentially spaced apart from one another with the same intervals. The spring strands include a first spring strand 410, a second spring strand 420, and a third spring strand 430.

The first, second, and third spring strands 410, 420, and 430 are circumferentially differently turned. The term 'circumferential' means any one of 'clockwise' and 'counterclockwise'. The first, second, and third spring strands 410, 420, and 430 are circumferentially turned at the same angle. That is, the spring strands 410, 420, and 430 are turned at 120 degrees with respect to one another.

The spring strands 410, 420, and 430 are each divided into a spring body and both ends (a front spring link and a rear spring link). In detail, the first spring strand 410 is divided into a first spring body 412, a first front spring link 414, and a first rear spring link 416. The second spring strand 420 is divided into a second spring body 422, a second front spring link 424, and a second rear spring link 426. The third spring strand 430 is divided into a third spring body 432, a third front spring link 434, and a third rear spring link 436.

The first, second, and third spring bodies 410, 420, and 430 extend while each forming a virtual circle having a spring diameter R in the radial direction. The center of the spring diameter R is referred to as a spring center and a line axially extending from the spring center is referred to as a spring central axis C. The spring central axis C coincides with a reciprocation central axis of the driving assembly D including the piston 130.

The first, second, and third spring bodies 410, 420, and 430 axially extend with the same spring diameter R. Accordingly, the entire shape of the spring body 402 can be a cylindrical shape.

The first, second, and third front spring links 414, 424, and 434 bend radially inward. In other words, the first, second, and third front spring links 414, 424, and 434 are disposed radially inside the spring body 402. The first, second, and third front spring links 414, 424, and 434 can be understood as extending toward the central axis C.

The first bracket 440 is coupled to the first, second, and third front spring links 414, 424, and 434. That is, the first bracket 440 can be understood as a component that fixes the front spring links 414, 424, and 434 axially in the same plane.

As described above, the first bracket 440 may be formed in a ring shape. Accordingly, the first bracket 440 has an outer diameter and an inner diameter with respect to the central axis C. The outer diameter of the first bracket 440 may correspond to the outer diameter of the magnet frame 138 and the inner diameter of the first bracket 440 may correspond to the outer diameter of the third muffler 153.

The first, second, and third rear spring links 416, 426, and 436 bend radially inward. In other words, the first, second, and third rear spring links 416, 426, and 436 are disposed radially inside the spring body 402. The first, second, and third rear spring links 416, 426, and 436 can be understood as extending toward the central axis C.

The second bracket 460 is coupled to the first, second, and third rear spring links 416, 426, and 436. That is, the second bracket 460 can be understood as a component that fixes the rear spring links 416, 426, and 436 axially in the same plane.

As described above, the second bracket 460 may be formed a flat plate shape radially extending from the central axis C. The outermost side of the second bracket 460 may be positioned axially in the same line as the stator cover 149. Accordingly, the stator cover 149 and the second bracket 460 can be combined through the spring fasteners 450.

As described above, both ends of the spring of the present invention can be bent radially inward and a pair of brackets can be disposed inside the spring body.

Figure 12:
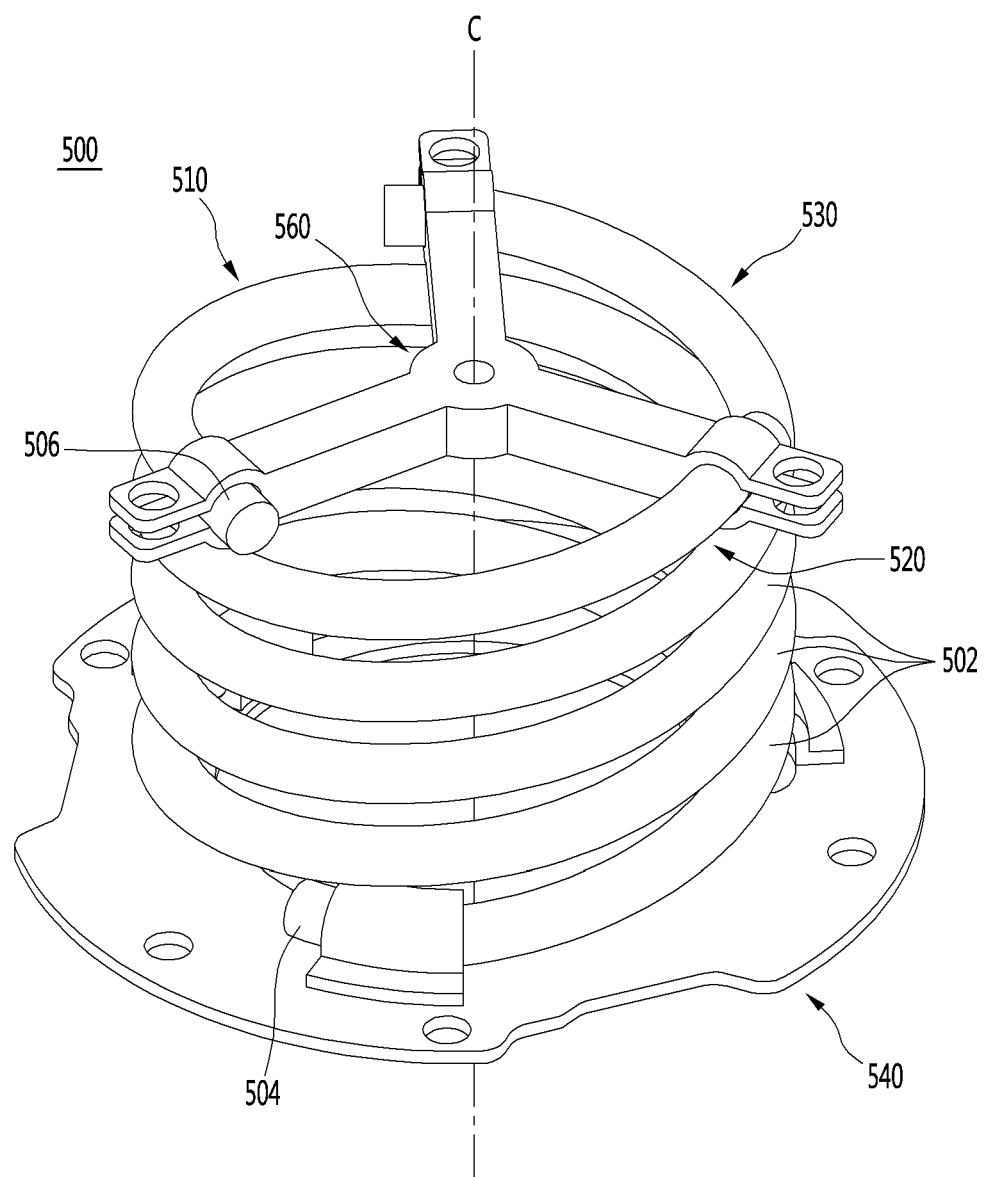
FIGS. 12 and 13 are views showing a spring of a linear compressor according to a fourth embodiment of the present invention.
Figure 13:
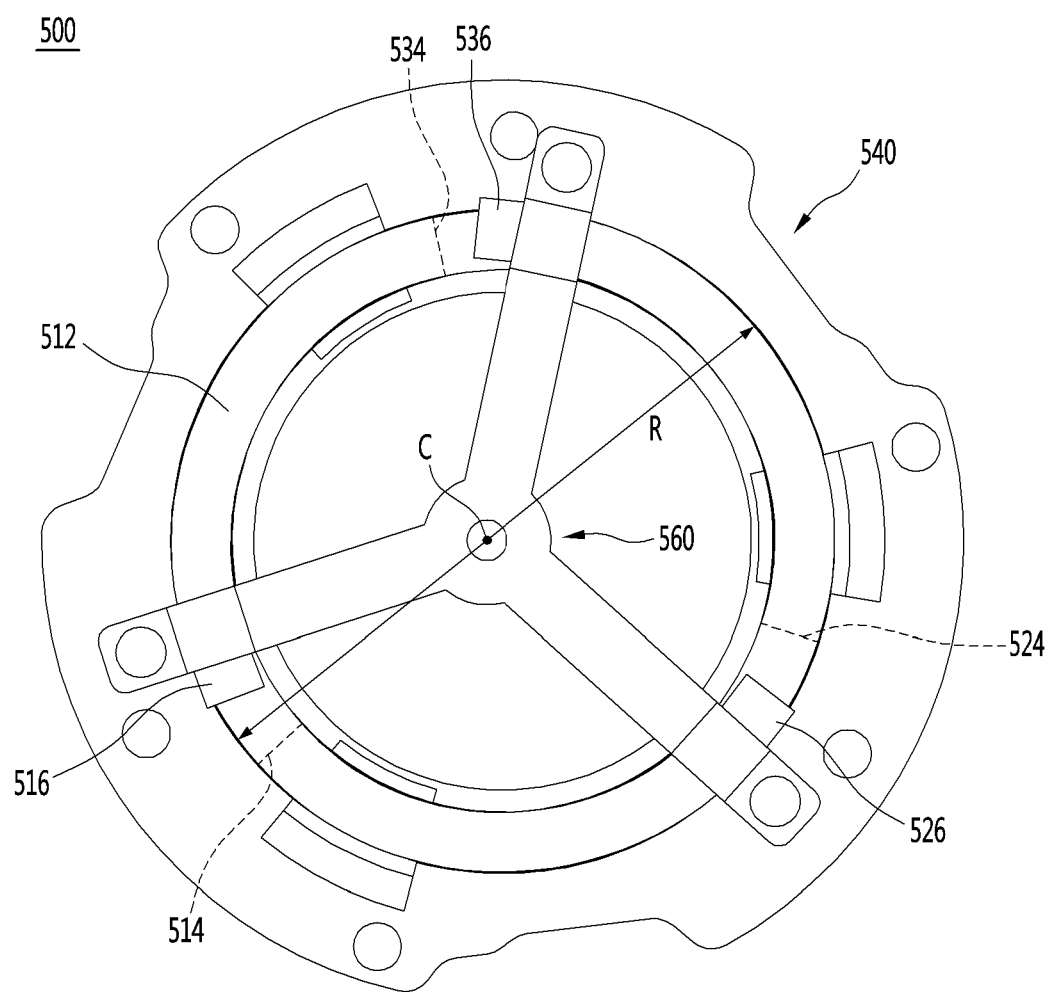

FIGS. 12 and 13 are views showing a spring of a linear compressor according to a fourth embodiment of the present invention.

As shown in FIGS. 12 and 13, a spring 500 includes a first bracket 540 coupled to a front spring link 504 and a second bracket 560 coupled to a rear spring link 506.

The first bracket 540 may be a flat plate radially extending. Accordingly, the first bracket 540 can form one plane perpendicular to the axial direction. The first bracket 540 may have a portion that protrudes axially rearward to fix the front spring link 504.

For example, the first bracket 540 can be coupled to the stator cover 149. Accordingly, the first bracket 540 may be a ring-shaped flat plate corresponding to the stator cover 149. An opening for avoiding the cover fasteners 149*a* coupled to the stator cover 149 may be formed at the first bracket 540.

The second bracket 560 may be formed in a shape with a plurality of rods radially extending from the central axis C. Accordingly, the second bracket 560 can form one plane perpendicular to the axial direction. The second bracket 560 may have a portion for fixing the rear spring link 506 at a radial end.

For example, the second bracket 560 can be coupled to the suction muffler 150. In detail, the second bracket 560 can be coupled to the rear surface of the third muffler 153 into which a refrigerant flows. Accordingly, a hole for flow of a refrigerant may be formed at the second bracket 560.

The spring 500 is composed of a plurality of spring strands 510, 520, and 530. The spring 500 is divided into a spring body 502 spirally extending and both ends (hereafter, a front spring link 504 and a rear spring link 506) of the spring body 502.

The spring strands have the same shape and are circumferentially spaced apart from one another with the same intervals. The spring strands include a first spring strand 510, a second spring strand 520, and a third spring strand 530.

The first, second, and third spring strands 510, 520, and 530 are circumferentially differently turned. The term 'circumferential' means any one of 'clockwise' and 'counterclockwise'. The first, second, and third spring strands 510, 520, and 530 are circumferentially turned at the same angle. That is, the spring strands 510, 520, and 530 are turned at 120 degrees with respect to one another.

The spring strands 510, 520, and 530 are each divided into a spring body and both ends (a front spring link and a rear spring link). In detail, the first spring strand 510 is divided into a first spring body 512, a first front spring link 514, and a first rear spring link 516. The second spring strand 520 is divided into a second spring body 522, a second front spring link 524, and a second rear spring link 526. The third spring strand 530 is divided into a third spring body 532, a third front spring link 534, and a third rear spring link 536.

The first, second, and third spring bodies 510, 520, and 530 extend while each forming a virtual circle having a spring diameter R in the radial direction. The center of the spring diameter R is referred to as a spring center and a line axially extending from the spring center is referred to as a spring central axis C. The spring central axis C coincides with a reciprocation central axis of the driving assembly D including the piston 130.

The first, second, and third spring bodies 510, 520, and 530 axially extend with the same spring diameter R. Accordingly, the entire shape of the spring body 502 can be a cylindrical shape.

The first, second, and third front spring links 514, 524, and 534 and the first, second, and third rear spring links 516, 526, and 536 extend with the same curvature as that of the spring body 502. Accordingly, the first, second, and third rear spring links 516, 526, and 536 are arranged radially in parallel with the spring body 502 and the first, second, and third front spring links 514, 524, and 534.

In other words, a bending end is not formed at the spring 500. Accordingly, the front spring link 504 and the rear spring link 506 can be understood as a portion of the spring body 502.

The first bracket 540 is coupled to the first, second, and third front spring links 514, 524, and 534. That is, the first bracket 340 can be understood as a component that fixes the front spring links 514, 524, and 534 axially in the same plane.

As described above, the first bracket 540 may be formed in a ring shape. Accordingly, the first bracket 540 has an outer diameter and an inner diameter with respect to the central axis C.

The outer diameter of the first bracket 540 is larger than the spring diameter R. The inner diameter of the first bracket 540 is smaller than the spring diameter R. Accordingly, when the spring 500 is compressed, the first bracket 540 can support at least a portion of the spring body 502.

The second bracket 560 is coupled to the first, second, and third rear spring links 516, 526, and 536. That is, the second bracket 560 can be understood as a component that fixes the rear spring links 516, 526, and 536 axially in the same plane.

As described above, the second bracket 560 has a plurality of rods radially extending from the central axis C. Accordingly, the second bracket 560 may have three rods coupled to the first, second, and third rear spring links 516, 526, and 536. The rods are circumferentially spaced apart from each other at 120 degrees.

As described above, the spring of the present invention can be composed of spring strands having various shapes and brackets. The shapes shown in the figures are example and the spring of the present invention can be modified in various ways.

What is claimed is:

1. A linear compressor comprising:
    a driving assembly configured to reciprocate in an axial direction;
    a spring that supports the driving assembly in the axial direction; and
    a bracket coupled to the spring and the driving assembly,
    wherein the spring comprises a plurality of spring strands, each of the plurality of spring strands comprising:
        a spring body that spirally extends about a spring central axis extending in the axial direction,
        an inside end portion that extends from a first side of the spring body and that is coupled to the bracket, and
        an outside end portion that extends from a second side of the spring body.

2. The linear compressor of claim 1, wherein the bracket defines a plane that is perpendicular to the spring central axis.

3. The linear compressor of claim 1, wherein the bracket defines a hole that penetrates through the bracket in the axial direction.

4. The linear compressor of claim 1, wherein the driving assembly comprises:
    a piston configured to reciprocate in the axial direction; and
    a suction muffler disposed inside of the spring, wherein at least a portion of the suction muffler is disposed in the piston.

5. The linear compressor of claim 4, wherein the piston is configured to reciprocate between a front position and a rear position, and
    wherein the spring is disposed at a rear portion of the piston that faces the rear position.

6. The linear compressor of claim 4, wherein the spring surrounds the suction muffler.

7. The linear compressor of claim 1, wherein the outside end portion of each of the plurality of spring strands is bent radially outward with respect to the spring central axis.

8. A linear compressor comprising:
a driving assembly configured to reciprocate in an axial direction; and
a spring that supports the driving assembly in the axial direction,
wherein the spring comprises a plurality of spring strands, each of the plurality of spring strands comprising:
a spring body that spirally extends about a spring central axis extending in the axial direction,
an inside end portion that extends from a first side of the spring body, and
an outside end portion that extends from a second side of the spring body and that is bent radially outward with respect to the spring central axis.

9. The linear compressor of claim 8, wherein the driving assembly comprises:
a piston configured to reciprocate in the axial direction; and
a suction muffler disposed in the spring, wherein at least a portion of the suction muffler is disposed in the piston.

10. The linear compressor of claim 9, wherein the piston is configured to reciprocate between a front position and a rear position, and
wherein the spring is disposed rearward relative to a rear portion of the piston that faces the rear position.

11. The linear compressor of claim 9, wherein the spring surrounds the suction muffler.

12. The linear compressor of claim 8, further comprising:
a bracket coupled to the driving assembly and the inside end portion of each of the plurality of spring strands.

13. The linear compressor of claim 12, wherein the bracket defines a plane that is perpendicular to the spring central axis.

14. The linear compressor of claim 12, wherein the bracket defines a hole that penetrates through the bracket in the axial direction.

15. A linear compressor comprising:
a driving assembly comprising:
a piston configured to reciprocate in an axial direction,
a magnet frame coupled to a rear portion of the piston, and
a suction muffler, wherein at least a portion of the suction muffler is disposed in the piston;
a supporting assembly that supports the driving assembly, the supporting assembly comprising a cylinder disposed outside of the piston, an outer stator disposed outside of the cylinder, and a stator cover disposed rearward relative to the outer stator; and
a spring that supports the driving assembly in the axial direction,
wherein the spring comprises a plurality of spring strands, each of the plurality of spring strands comprising:
a spring body that spirally extends about a spring central axis extending in the axial direction,
a first end portion that extends from a first side of the spring body and that is coupled to the stator cover, and
a second end portion that extends from a second side of the spring body and that is coupled to the magnet frame.

16. The linear compressor of claim 15, further comprising:
a spring fastener that couples the first end portion of each of the plurality of spring strands to the stator cover.

17. The linear compressor of claim 16, wherein the spring fastener extends in the axial direction.

18. The linear compressor of claim 16, wherein the spring fastener comprises a plurality of spring fasteners that are spaced apart from one another in a circumferential direction of the stator cover.

19. The linear compressor of claim 15, wherein the spring is disposed rearward relative to the rear portion of the piston.

20. The linear compressor of claim 15, wherein the spring surrounds the suction muffler.

* * * * *